(12) United States Patent
Baek et al.

(10) Patent No.: US 9,978,155 B2
(45) Date of Patent: May 22, 2018

(54) METHOD AND APPARATUS FOR COUNTING NUMBER OF PERSONS

(71) Applicant: Hanwha Techwin Co., Ltd., Changwon-si (KR)

(72) Inventors: Youngmin Baek, Changwon-si (KR); Soonmin Bae, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 199 days.

(21) Appl. No.: 14/833,492

(22) Filed: Aug. 24, 2015

(65) Prior Publication Data

US 2016/0292890 A1 Oct. 6, 2016

(30) Foreign Application Priority Data

Apr. 3, 2015 (KR) .................. 10-2015-0047495

(51) Int. Cl.
G06K 9/00 (2006.01)
G06T 7/60 (2017.01)
G06T 7/215 (2017.01)
G06T 7/64 (2017.01)

(52) U.S. Cl.
CPC .......... G06T 7/604 (2013.01); G06K 9/00771 (2013.01); G06T 7/215 (2017.01); G06T 7/64 (2017.01); G06T 2207/10028 (2013.01); G06T 2207/30196 (2013.01); G06T 2207/30242 (2013.01)

(58) Field of Classification Search
CPC .......... G06T 7/604; G06T 7/602; G06T 7/64; G06T 7/0051; G06T 7/20; G06T 2207/30242
USPC ....................................... 382/103
See application file for complete search history.

(56) References Cited

U.S. PATENT DOCUMENTS

2005/0201612 A1* 9/2005 Park ................ G06K 9/00778
382/154
2016/0055645 A1* 2/2016 Ito .................... G06T 7/0083
382/103
2016/0321507 A1* 11/2016 Yang .............. G06K 9/00778

FOREIGN PATENT DOCUMENTS

| JP | 4493521 B2 | 6/2010 |
|---|---|---|
| KR | 10-0519782 B1 | 10/2005 |
| KR | 10-0885418 B1 | 2/2009 |
| KR | 10-2015-0010193 A | 1/2015 |

* cited by examiner

Primary Examiner — Van D Huynh
(74) Attorney, Agent, or Firm — Sughrue Mion, PLLC

(57) ABSTRACT

A method and apparatus for counting a number of persons in an image are provided. The person counting apparatus includes: a detector configured to detect a movement area in a top-view distance image, of at least one image frame, providing distance information; an estimator configured to estimate a candidate head area from the movement area based on the distance information; and a determiner configured to determine whether the candidate head area is an actual head of a person based on a similarity to a circle of the candidate head area and a spherical curvature of the candidate head area estimated from the distance information about the candidate head area.

18 Claims, 15 Drawing Sheets

METHOD AND APPARATUS FOR COUNTING NUMBER OF PERSONS

CROSS-REFERENCE TO THE RELATED APPLICATION

This application claims priority from Korean Patent Application No. 10-2015-0047495, filed on Apr. 3, 2015, in the Korean Intellectual Property Office, the disclosure of which is incorporated herein in its entirety by reference.

BACKGROUND

1. Field

Apparatuses and methods consistent with exemplary embodiments relate to counting a number of persons in image processing.

2. Description of the Related Art

Recently, due to increased demand for safety improvements after the occurrence of casualty-causing accidents, it is important to obtain information regarding a number of persons in a particular space for purposes including rescue operations.

Furthermore, a company may count the numbers of persons who enter and leave in respective time slots or at respective locations and utilize corresponding information for marketing purposes. Therefore, there is also a demand for a system for counting the number of persons for commercial purposes.

SUMMARY

Exemplary embodiments of the inventive concept provide a method and apparatus for accurately counting a number of persons in an image even in complicated situations in which a plurality of persons move adjacent to one another in the image or an object that resembles a moving person.

Additional aspects will be set forth in part in the description which follows and, in part, will be apparent from the description, or may be learned by practice of the presented exemplary embodiments.

According to an aspect of an exemplary embodiment, there is provided a method of counting a number of persons in at least one image frame. The method may include detecting a movement area in a top-view distance image, of the at least one image frame, providing distance information; estimating a candidate head area from the movement area based on the distance information; and determining whether the candidate head area is an actual head of a person based on a similarity to a circle of the candidate head area and a spherical curvature of the candidate head area estimated from the distance information about the candidate head area.

The estimating a candidate head area may include: extracting a reference pixel, which is a pixel corresponding to a greatest height from a ground surface in the at least one image frame, from the movement area; setting an expanded area including the reference pixel and surrounding pixels with the same height as the reference pixel and surrounding pixels whose change in height is constant or decreases; and setting the candidate head area including the reference pixel and surrounding pixels with heights that differ from the height of the reference pixel within a pre-set critical value as a candidate head area. The method may further include: determining whether an area other than the expanded area exists in the movement area; and if it is determined that the other area exists, setting the other area as another movement area, and repeating the extracting the reference pixel, the setting the expanded area and the setting, and the setting the candidate head area with respect to the other movement area. The estimating a candidate head area may be repeatedly performed in another movement area.

In the determining whether the candidate head area is an actual head of a person, the similarity to a circle of the candidate head area may be determined by determining whether a ratio of an area of a smallest circle surrounding the candidate head area and an area of the candidate head area exceeds a pre-set critical value.

In the determining whether the candidate head area is an actual head of a person, the spherical curvature of the candidate head area may be determined using information about a height of a plurality of points on each of at least one reference line extending across the candidate head area.

The determining whether the candidate head area is an actual head of a person may include: determining satisfaction of a circle-similarity condition by determining whether a ratio of an area of a smallest circle surrounding the candidate head area and an area of the candidate head area exceeds a first pre-set critical value is satisfied; if at least one reference line extending across the candidate head area is approximated to a quadratic function including a location of a point on the reference line and a height of the point on the reference line from a ground surface in the at least one image frame as variables of the quadratic function, determining satisfaction of a spherical curvature condition by determining whether a pole of the quadratic function exists in the candidate head area and whether a second-order coefficient is smaller than or equal to a second pre-set critical value; and setting the candidate head area satisfying the circle-similarity condition and the spherical curvature condition to be the actual head of a person.

The determining satisfaction of the spherical curvature condition may include determining whether each of a plurality of reference lines arranged at a designated interval in the candidate head area satisfies the spherical curvature condition.

The method may further include: if a tracked path of the candidate head area in the at least one image frame passes a counting line and a ratio of a total number of image frames in which the candidate head area is detected to a number of valid frames in which the candidate head area is determined as being the actual head of a person is equal to or greater than a pre-set critical value, counting the candidate head area as a person.

According to another aspect of an exemplary embodiment, there is provided a person counting apparatus which may include: a detector configured to detect a movement area in a top-view distance image, of at least one image frame, providing distance information; an estimator configured to estimate a candidate head area from the movement area based on the distance information; and a determiner configured to determine whether the candidate head area is an actual head of a person based on a similarity to a circle of the candidate head area and a spherical curvature of the candidate head area estimated from the distance information about the candidate head area.

The estimator may include: a reference pixel extractor configured to extract a reference pixel, which is a pixel corresponding to a greatest height from a ground surface in the at least one image frame, from the movement area; an area expander configured to set an expanded area including the reference pixel and surrounding pixels with the same height as the reference pixel and surrounding pixels whose change in height is constant or decreases; and a candidate head area setter configured to set the candidate head area including the reference pixel and surrounding pixels with heights that differ from the height of the reference pixel within a pre-set critical value as a candidate head area.

The estimator may be further configured to determine whether an area other than the expanded area exists in the movement area; and in response to the determining that the other area exists, the estimator may be configured to set the other area as another movement area, and repeat the extracting the reference pixel, the setting the expanded area and the setting, and the setting the candidate head area with respect to the other movement area.

In order to determine whether the candidate head area is an actual head of a person, the determiner may be configured to determine the similarity to a circle of the candidate head area by determining whether a ratio of an area of a smallest circle surrounding the candidate head area and an area of the candidate head area exceeds a pre-set critical value.

In order to determine whether the candidate head area is an actual head of a person, the determiner may be configured to determine the spherical curvature of the candidate head area using information about a height of a plurality of points on each of at least one reference line extending across the candidate head area.

The determiner may include: a first determiner configured to determine satisfaction of a circle-similarity condition by determining whether a ratio of an area of a smallest circle surrounding the candidate head area and an area of the candidate head area exceeds a first pre-set critical value is satisfied; a second determiner configured to, if at least one reference line extending across the candidate head area is approximated to a quadratic function including a location of the point on the reference line and a height of the point on the reference line from a ground surface in the at least one image frame as variables of the quadratic function, determine satisfaction of a spherical curvature condition by determining whether a pole of the quadratic function exists in the candidate head area and whether a second-order coefficient is smaller than or equal to a second pre-set critical value; and a third determiner configured to determine the candidate head area satisfying the circle-similarity condition and the spherical curvature condition to be the actual head of a person.

The determiner may be configured to determines whether each of a plurality of reference lines arranged at a designated interval in the candidate head area satisfies the spherical curvature condition.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
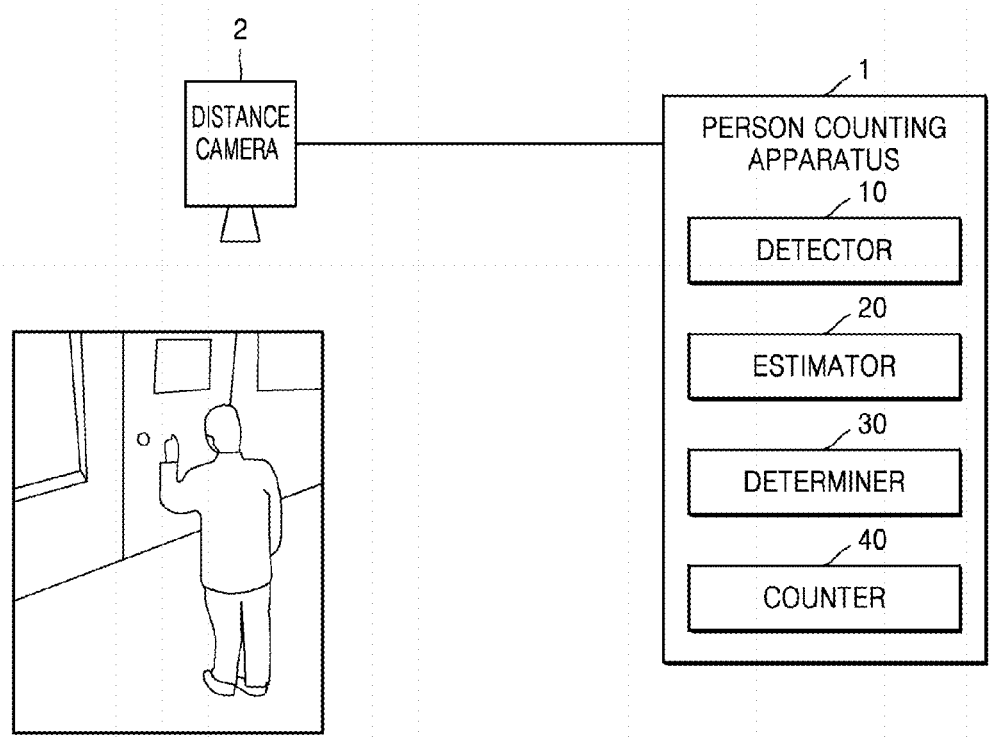
FIG. 1 is a diagram showing a person counting system, according to an exemplary embodiment.

Reference will now be made in detail to exemplary embodiments which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain various aspects thereof.

As the inventive concept allows for various changes and numerous embodiments, particular exemplary embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. In the description of the inventive concept, certain detailed explanations of the related art are omitted when it is deemed that they may unnecessarily obscure the essence of the inventive concept.

While such terms as "first," "second," etc., may be used to describe various components, such components must not be limited to the above terms. The above terms are used only to distinguish one component from another.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept may be described in terms of functional block components and various processing steps. For example, at least one of the blocks illustrated in FIGS. 1, 3, and 7 may be realized by any number of hardware and/or software components configured to perform the specified functions. For example, the block employ various integrated circuit (IC) components, e.g., memory elements, processing elements, logic elements, look-up tables, and the like, which may carry out a variety of functions under the control of one or more microprocessors or other control devices. Similarly, where the at least one of the blocks may be implemented using software programming or software elements, it may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the at least one block could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

Figure 2A:
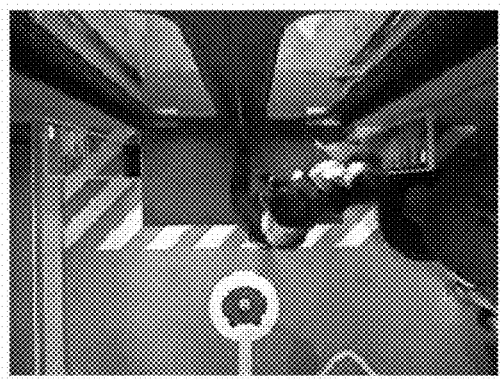
FIGS. 2A and 2B illustrate an example of top-view images, according to an exemplary embodiment.
Figure 2B:
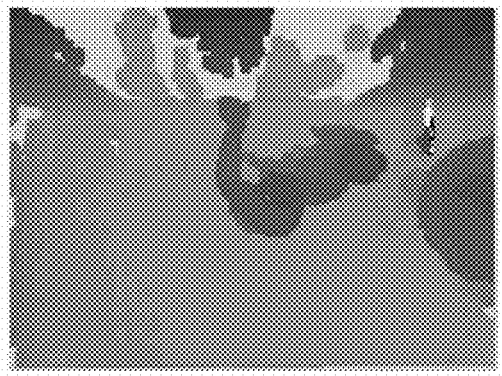

FIG. 1 is a schematic block diagram showing a person counting system according to an exemplary embodiment. FIGS. 2A and 2B illustrate an example of top-view image according to an exemplary embodiment.

Referring to FIG. 1, a person counting system according to an exemplary embodiment includes a person counting apparatus 1 and a distance camera 2.

The distance camera 2 is a camera which outputs distances to all locations that are being captured by a camera, and more particularly, and each pixel has a distance value indicating a distance to an object being captured. Therefore, if information regarding a space in which the camera is installed is known, a length of the object may be calculated from an image. The distance camera 2 may be any of various types of distance cameras, such as a stereoscopic camera, a structured light camera, and a Time-of-Flight (ToF) camera, that captures images of a surrounding environment or scene (space) and obtains distance information or depth information regarding the scene including various objects (e.g., stationary objects including a ground surface, walls, and obstacles or dynamic objects including persons and animals). Here, an image providing distance information or depth information will be referred to as a distance image. Although not shown, the person counting system may further include a visible ray camera for obtaining red, green and blue (RGB) images.

Referring to FIG. 1, the distance camera 2 is installed as a top-view camera that is directed downward and obtains a top-view image. In the case of a top-view distance camera, a height of an object may be calculated by calculating a difference between a depth of a space and a distance to the object.

FIG. 2A is an image obtained by a common surveillance camera, and FIG. 2B is a top-view image obtained by the distance camera 2. In an image obtained by a common surveillance camera, objects are shown as they appear visually. However, in an image obtained by a distance camera, objects are shown in different colors based on distances between a camera and the respective objects. For example, the closest object to the camera may be shown having a dark color, whereas the farthest object from the camera may be shown having a light color.

A person counting system using a surveillance camera in the related art counts a number of persons by detecting movement areas via background modeling and determining the movement areas as persons. However, in this case, two or more persons moving close to one another may be counted as one person.

According to exemplary embodiments of the inventive concept, distance information regarding an object may be obtained by using a top-view distance camera, a 2-dimensional (2D) shape or a 3-dimensional (3D) shape of the object may be determined based on the distance information, and a number of persons may be accurately counted by comparing the determined shape to shape of a person that is predetermined. Distance information may be a distance between a camera to an object or a height of an object from the ground.

The person counting apparatus 1 includes a detector 10, an estimator 20, a determiner 30, and a counter 40. The detector 10 detects movement areas in a top-view image obtained by the distance camera 2, and the estimator 20 detects candidate head areas, that is, areas estimated as heads from the detected movement areas. The determiner 30 checks a similarity to a circle (hereinafter referred to as a circle-similarity) and spherical curvatures regarding the detected candidate head areas and determines whether the detected candidate head areas correspond to heads of persons, and the counter 40 finally counts the number of persons by determining whether the candidate head areas pass a counting line and determining frame number ratios.

The detector 10 performs preprocessing with respect to an input top-view image. In a top-view image, holes at which distances may not be measured are formed due to factors including noise, where the holes are corrected via a hole filling preprocessing operation. According to exemplary embodiments, preprocessing operations are not limited, and one of ordinary skill in the related art may easily perform various preprocessing operations.

When preprocessing of an image is completed, the detector 10 detects movement areas in the image. According to exemplary embodiments, methods of detecting movement areas are not limited, and various techniques, such as a Gaussian mixture model (GMM) or a codebook model, may be employed.

The estimator 20 estimates candidate head areas based on distance information in movement areas. Hereinafter, operation of the estimator 20 will be described in detail with reference to FIGS. 3 through 6.

Figure 3:
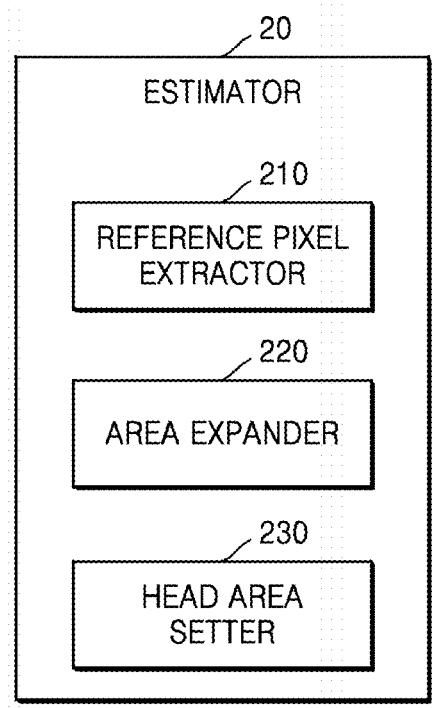
FIG. 3 is a schematic block diagram showing an estimator of FIG. 1, according to an exemplary embodiment.
Figure 4:
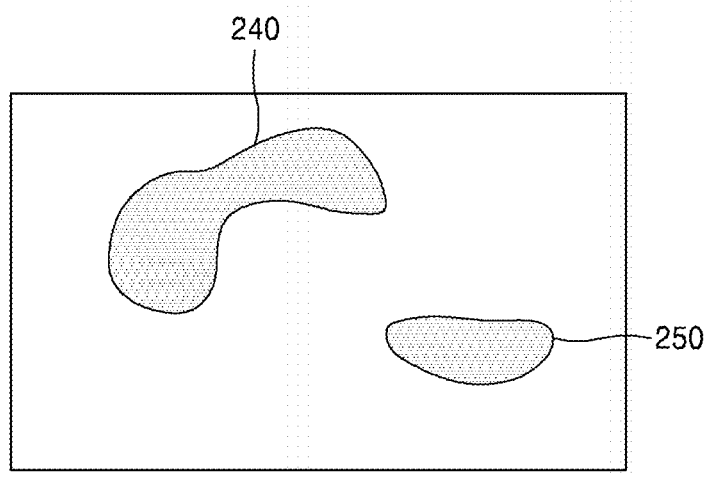
FIG. 4 is a diagram showing an example detected by the estimator.

FIG. 3 is a schematic block diagram showing the estimator 20 of FIG. 1, according to an exemplary embodiment, and FIGS. 4 and 5 are diagrams for describing operation of the estimator 20, according to exemplary embodiments.

Referring to FIG. 3, the estimator 20 may include a reference pixel extractor 210, an area expander 220, and a head area setter 230.

The reference pixel extractor 210 extracts a reference pixel having the greatest height from the ground surface from a movement area detected by the detector 10.

The area expander 220 includes surrounding pixels with the same height as the reference pixel or surrounding pixels of change of height is constant or decreases in an expanded area.

The head area setter 230 sets surrounding pixels with heights that differ from the height of the reference pixel within a first preset critical value as a candidate head area. The first pre-set critical value may be set by a user.

FIG. 4 shows an example screen image from which movements of two persons adjacent to each other and one independent person are detected. For example, a large movement area 240 is detected when the two persons move adjacent to each other arm-in-arm, and a relatively small movement area 250 is detected when the one person moves independently.

Figure 5A:
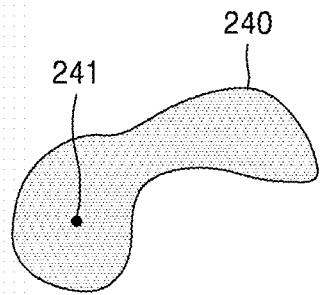
FIGS. 5A-5F describe an estimating operation of the estimator when two or more persons move adjacent to one another, according to an exemplary embodiment.
Figure 5B:
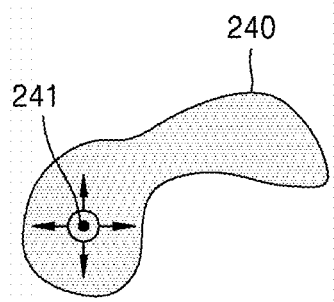
Figure 5C:
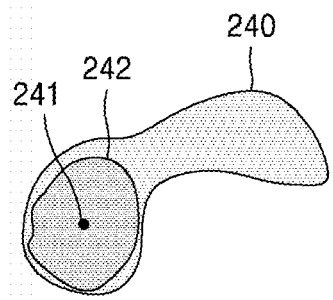
Figure 5D:
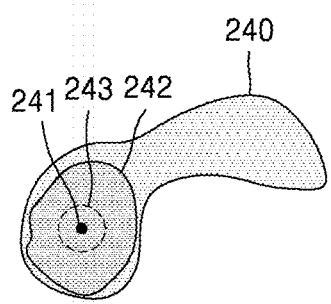
Figure 5E:
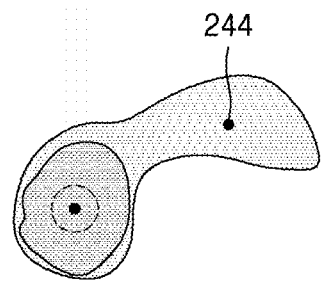
Figure 5F:
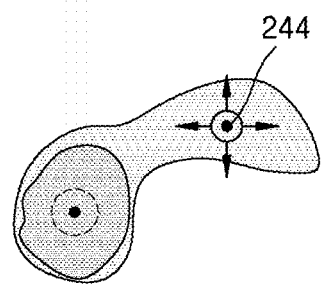

FIGS. 5A-5F shows an operation for estimating candidate head areas that is performed by the estimator 20 when two or more persons move adjacent to one another. FIG. 5A shows an operation in which the reference pixel extractor 210 extracts a reference pixel 241 from the selected large movement area 240. The reference and FIG. 5C show operations in which the area expander 220 includes surrounding pixels with the same height as the reference pixel or surrounding pixels whose change of height is constant or decreases in an expanded area 242. FIG. 5D shows an operation in which the head area setter 230 sets a candidate head area 243 from the expanded area 242. The head area setter 230 estimates the candidate head area 243 including the reference pixel 241 and the surrounding pixels with heights that differ from the height of the reference pixel within the first preset critical value. As shown in FIGS. 5E and 5F, the estimator 20 repeats the operation for estimating candidate head areas as shown in FIGS. 5A-5D with respect to the remaining area of the large movement area 240 that is not set as the expanded area 242.

Figure 6:
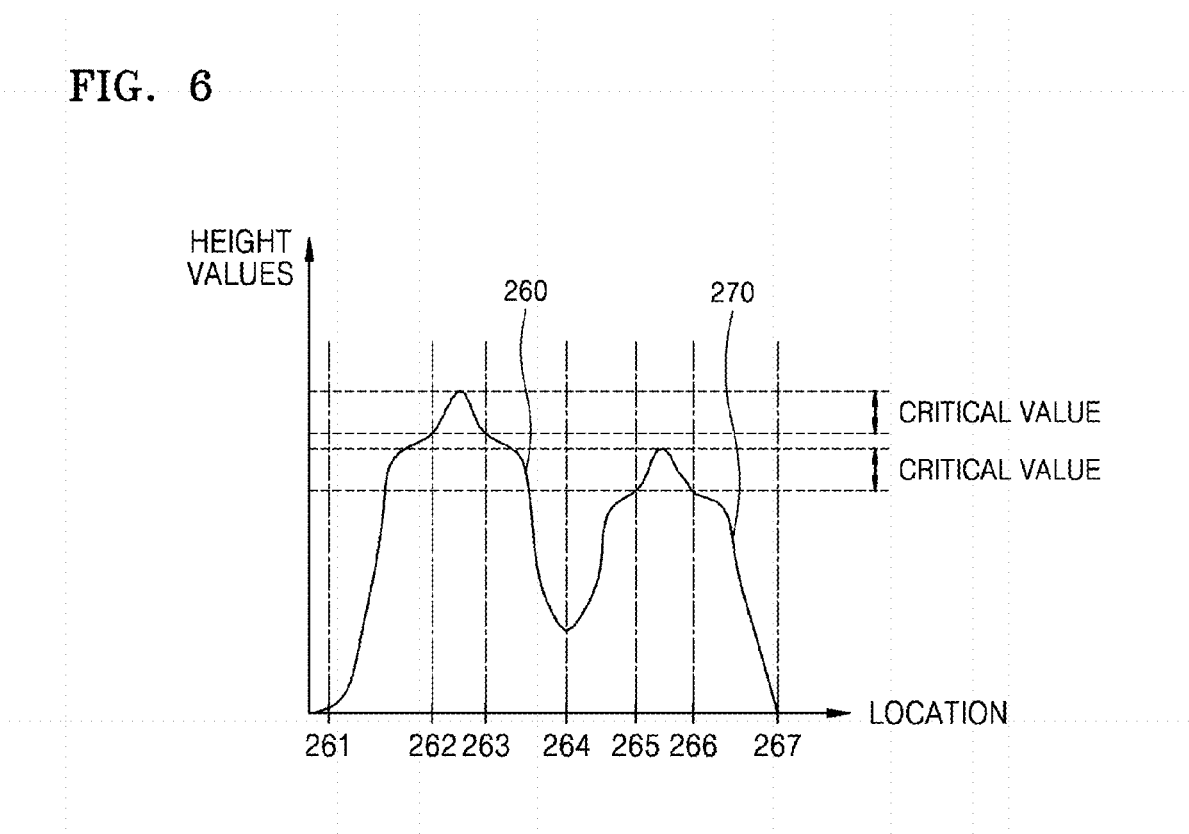
FIG. 6 is a diagram one-dimensionally showing an example of setting expanded areas, according to an exemplary embodiment.

FIG. 6 is a diagram one-dimensionally showing an example of setting expanded areas according to an exemplary embodiment, regarding a case where there are a left person 260 and a right person 270. First, an expanded area regarding the left person 260 corresponds to an area between a left boundary 261 and a right boundary 264, and a candidate head area regarding the left person 260 corresponds to a left boundary 262 of a head area and a right boundary 263 of a head area. In the same regard, an expanded area regarding the right person 270 corresponds to an area between a left boundary 264 and a right boundary 267, and a candidate head area regarding the right person 270 corresponds to an area between 265 and 266.

The person counting apparatus 1 tracks respective candidate head areas in every frame. To this end, the person counting apparatus 1 may include a tracker (not shown).

Referring back to FIG. 1, the determiner 30 checks a circle-similarity and spherical curvature regarding the detected candidate head area and determines whether the detected candidate head area corresponds to a head of a person. The operation of the determiner 30 will be described below in detail with reference to FIGS. 7 through 9.

Figure 7:
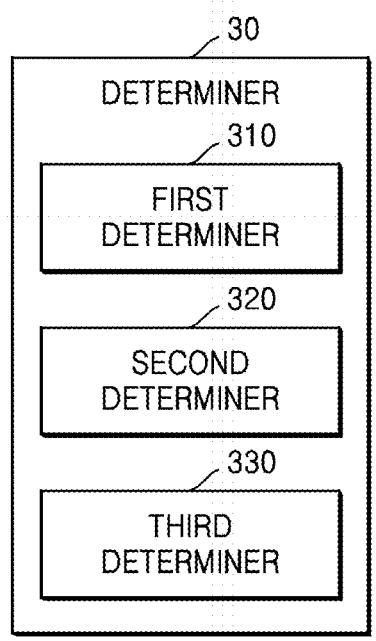
FIG. 7 is a schematic block diagram showing the configuration of the determiner, according to an exemplary embodiment.

FIG. 7 is a schematic block diagram showing the configuration of the determiner 30. Referring to FIG. 7, the determiner 30 may include a first determiner 310, a second determiner 320, and a third determiner 330.

The first determiner 310 calculates a circle-similarity of a candidate head area and determines whether the calculated circle-similarity exceeds a second pre-set critical value $T_{circular}$. The circle-similarity is a ratio of an area of a smallest circle surrounding the candidate head area to an area of the candidate head area as shown in Equation (1) below. Here, $S_{circular}$ denotes a circle-similarity, $A_{head}$ denotes area of an estimated candidate head area, and $A_{circle}$ denotes an area of the smallest circle surrounding the candidate head area. The second pre-set critical value may be set by a user.

$$S_{circular} = \frac{A_{Head}}{A_{Circle}} > T_{circular} \quad (1)$$

Figure 8A:
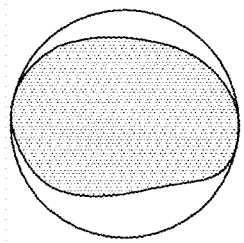
FIGS. 8A to 8D show examples of determination of a similarity to a circle of a candidate head area according to exemplary embodiments.
Figure 8B:
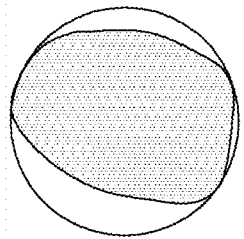
Figure 8C:
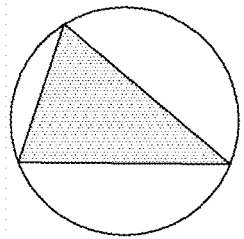
Figure 8D:
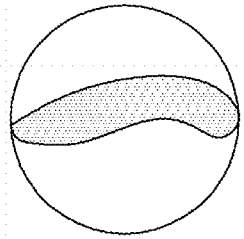

FIGS. 8A to 8D show examples of determination of a circle-similarity of a candidate head area. FIGS. 8A and 8B show examples regarding objects with high circle-similarities. FIGS. 8C and 8D show examples regarding objects with low circle-similarities. Based on determination of circle-similarity conditions, erroneous head detections regarding a hexahedral box carried by a person may be prevented.

Figure 9A:
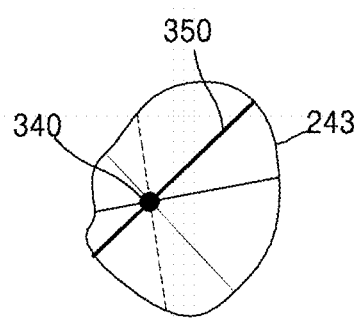
FIGS. 9A-9C show an example of determination of a spherical curvature condition of a candidate head area, according to an exemplary embodiment.
Figure 9B:
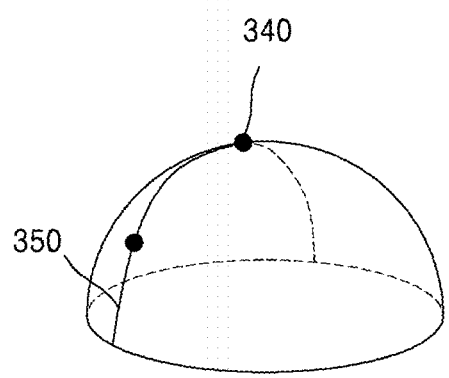
Figure 9C:
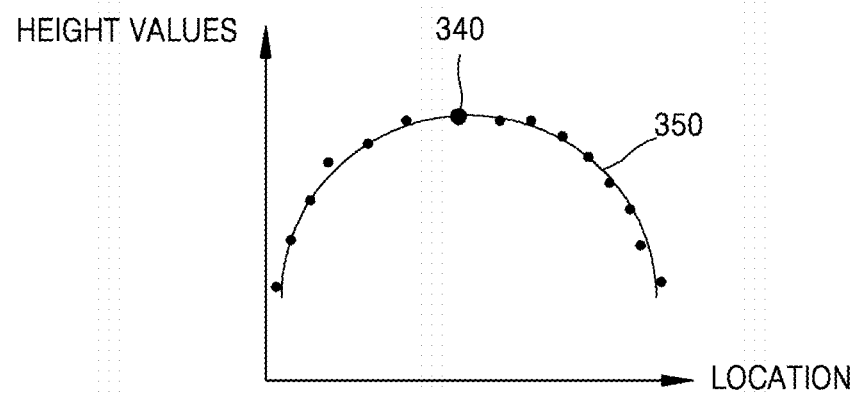

The second determiner 320 obtains spherical curvature information regarding the candidate head area and determines whether the spherical curvature information satisfies a spherical curvature condition. The second determiner 320 sets at least one reference line in the candidate head area and approximates each reference line to a quadratic function including a location of the point on the reference line and a height of the point on the reference line from the ground surface as variables of the quadratic function. The reference line is a line across the candidate head area. The approximation to a quadratic function may be performed by using the least squares fitting. The second determiner 320 determines whether a pole of the approximated quadratic function exists in the candidate head area and whether a second-order coefficient is smaller than or equal to a third pre-set critical value. If there are a plurality of reference lines (e.g., four (4) reference lines), the second determiner 320 determines whether a spherical curvature condition is satisfied with respect to each of the reference lines. The third pre-set critical value may be set by a user FIGS. 9A-9C show an example of determination of a spherical curvature condition of a candidate head area. As shown in FIG. 9A, the second determiner 320 sets four (4) reference lines 350 in the candidate head area 243, which pass through an arbitrary reference point 340 and extend across the candidate head area 243, and, as shown in FIG. 9C, approximates the reference lines 350 to a quadratic function including locations of the point on the reference lines 350 and heights of the point on the reference line from the ground surface as variables of the quadratic function. If (i) a pole of the quadratic function exists in the candidate head area 243 and (ii) a second-order coefficient is smaller than or equal to the third pre-set critical value, the second determiner 320 determines the candidate head area 243 as a head of a person. FIG. 9B shows an example in which the reference lines 350 are shown in a 3D space.

In detail, if a quadratic function $y=ax^2+bx+c$ (where y denotes a height and x denotes a location) is obtained by approximating the reference lines 350 to a quadratic function, the conditions (i) and (ii) may be expressed as shown below in Equations (2) and (3).

Condition (i)

$$0 < -\frac{b}{2a} < x_{max} \quad (2)$$

Condition (ii) $a<th_a$ (here, $th_a$ denotes a negative curvature coefficient) \quad (3)

The determination of a circle-similarity by the first determiner 310 and the determination of a spherical curvature by the second determiner 320 may be performed with respect to a candidate head area in every frame until the candidate head area passes a counting line.

According to another exemplary embodiment, the determination of a circle-similarity by the first determiner 310 and the determination of a spherical curvature by the second determiner 320 may be performed with respect to a candidate head area in a frame corresponding to a time point at which the candidate head area passes a counting line.

The third determiner 330 may determine a candidate head area, which satisfied both a circle-similarity condition and a spherical curvature condition, as an actual head of a person.

Referring back to FIG. 1, when a candidate head area is determined as a head of a person, the counter 40 counts the candidate head area.

If a tracked path of a candidate head area passes a counting line and a ratio of a total number of frames frame$_{total}$ in which the candidate head area is detected to a number of valid frames in which the candidate head area is identified as a head of a person from the detection of the candidate head area is equal to or greater than a fourth pre-set critical count value th$_{valid}$ until the candidate head area passes the counting line, the counter 40 counts the candidate head area as a person, as shown in Equation (4) below. The fourth pre-set critical count value may be set by a user.

$$\frac{\text{frame}_{valid}}{\text{frame}_{total}} \geq th_{valid} \quad (4)$$

Since a head of a person may be intermittently covered by another object or a candidate head area may not be identified as an actual head of a person in a particular frame due to reasons including noises, it is determined whether to count based on a ratio between numbers of frames, thereby improving counting accuracy.

Figure 10:
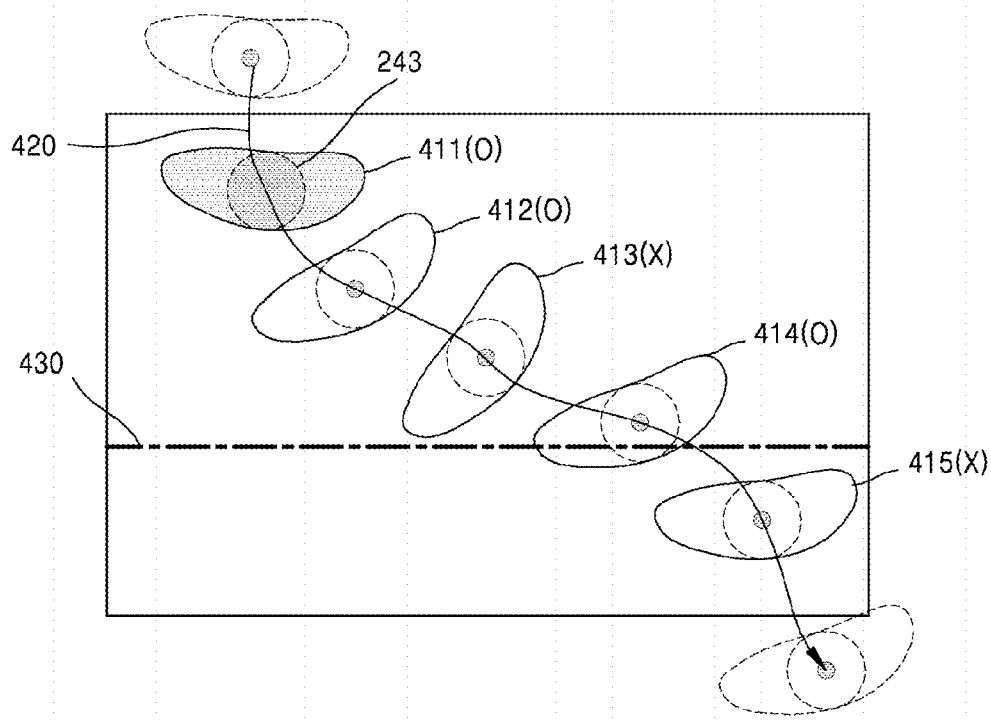
FIG. 10 is a diagram showing an example of a counting operation of a counter, according to an exemplary embodiment.

FIG. 10 is a diagram showing an example of a counting operation of the counter 40 with respect to candidate head areas, according to an exemplary embodiment. Total five (5) frames of image are obtained while the candidate head area 243 is detected, moves in a particular direction 420, and passes the counting line 430, where the respective frames will be denoted by reference numerals 411 through 415. The person counting apparatus 1 may determine whether the candidate head area 243 in a movement area is an actual head of a person in every frame. Here, it is assumed that the candidate head area 243 is identified as a head of a person in frames 411, 412, and 414 and is not identified as a head of a person in frames 413 and 415. For example, if the fourth pre-set critical value is 0.5, the total number of frames is five (5) and the number of valid frames is three (3), and thus, according to Equation (4), $$\frac{3}{5} = 0.6 > 0.5.$$

Since the condition of Equation (4) is satisfied and the candidate head area 243 passed the counting line 430, the candidate head area 243 is finally determined as a head of a person and is counted as one person.

In the above exemplary embodiment, the person counting apparatus 1 determines whether a candidate head area is a head of a person in every frame in which the candidate head area on a tracked path is detected.

Unlike in FIG. 10, the person counting apparatus 1 according to another exemplary embodiment may determine whether a candidate head area is a head of a person only when a tracked path of the candidate head area passes a counting line. In this case, the determiner 30 only tracks the candidate head area in the frames 411, 412, 413, and 414 of FIG. 10, and, only when the candidate head area passes the counting line, does the determiner 30 determine whether the candidate head area is an actual head of a person with respect to at least one of the frames in which the candidate head area on the tracked path is detected. In other words, it may only be determined whether the candidate head area is an actual head of a person with respect to the frame 415 (the frame immediately after the candidate head area passes the counting line 430), it may only be determined whether the candidate head area is an actual head of a person with respect to the frame 411 (the first frame in which the candidate head area is detected) and count the candidate head area, or, as in the above exemplary embodiment, it may be determined whether the candidate head area is an actual head of a person with respect to all frames 411 through 415 on the tracked path or all frames after the frame 415 and count the candidate head area if the ratio condition of Equation (4) is satisfied.

Figure 11:
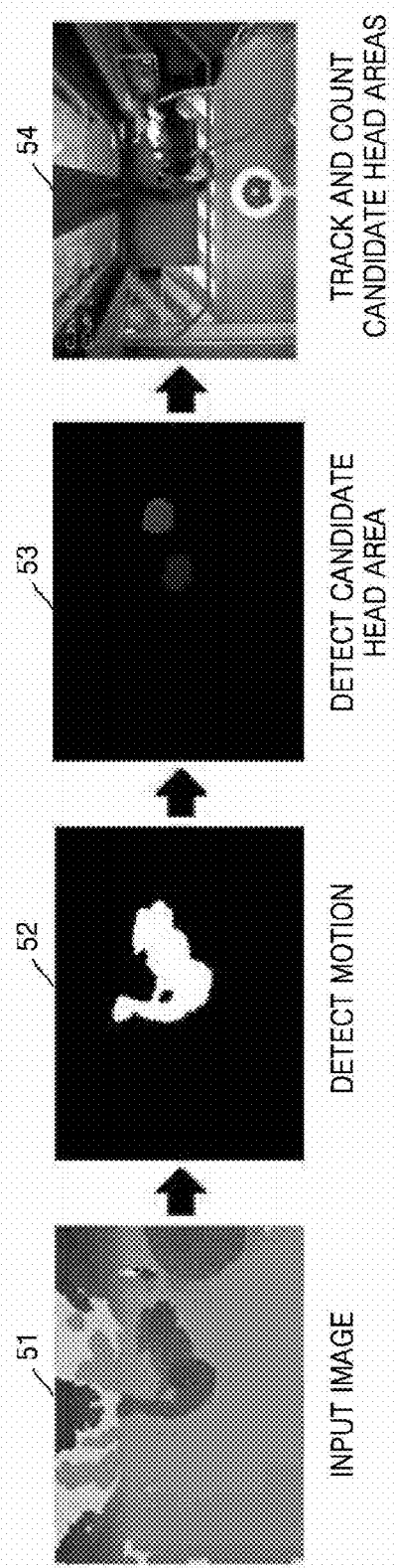
FIG. 11 is a diagram showing a method of counting a number of persons, according to an exemplary embodiment.

FIG. 11 is a diagram showing an example result of estimating a candidate head area according to an exemplary embodiment. Referring to FIG. 11, the person counting apparatus 1 detects a movement area (52) with respect to a top-view distance image 51, detects a candidate head area in the detected movement area (53), and tracks and counts the detected candidate head area (54).

Figure 12:
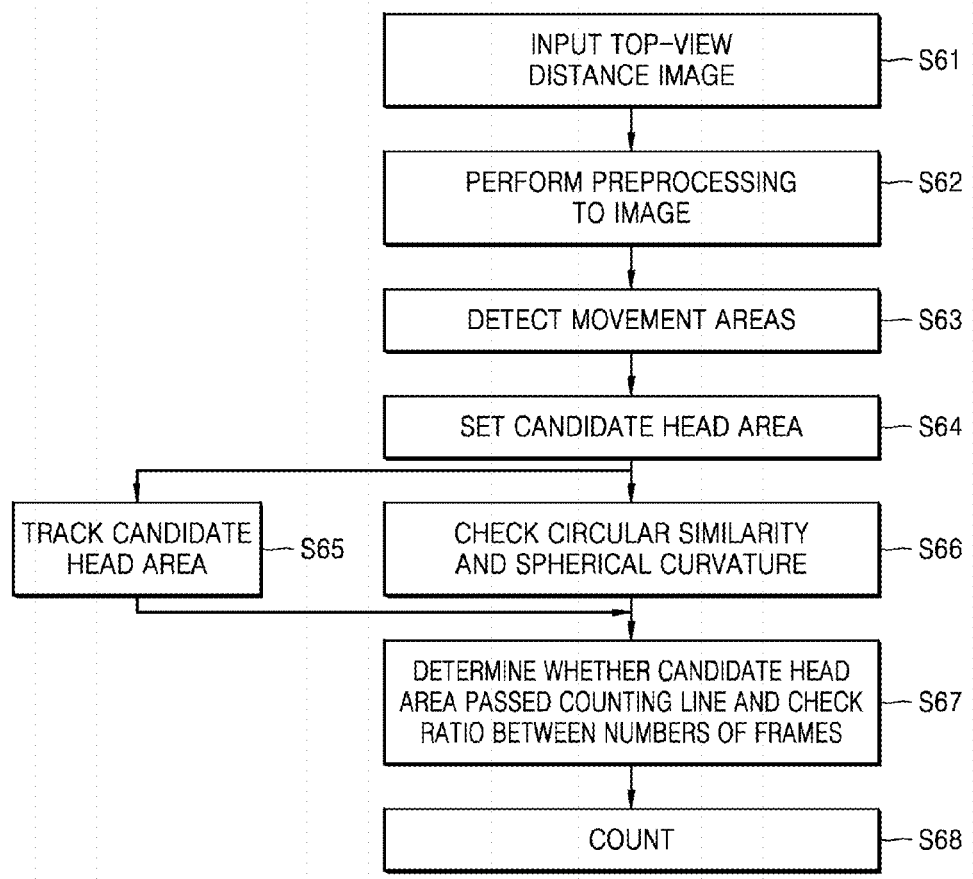
FIG. 12 is a flowchart of a method of counting a number of persons, according to an exemplary embodiment.

FIG. 12 is a flowchart for describing a method of counting a number of persons according to an exemplary embodiment.

The method of counting a number of persons shown in FIG. 12 may be performed by the counter 40 of FIG. 1. Descriptions already given above with reference to FIGS. 1 through 11 may be omitted below.

Referring to FIG. 12, the person counting apparatus 1 receives a top-view image distance image from the distance camera 2 (operation S61).

The detector 10 performs a preprocessing to the input distance image (operation S62) and detects at least one movement area (operation S63). The distance image provides distance information regarding an object, where the distance information may include a distance from a camera to the object.

The estimator 20 sets up a candidate head area, which is an area estimated as a head of a person, in each movement area (operation S64). In the movement area, the estimator 20 detects a pixel corresponding to the smallest distance, that is, a pixel corresponding to the greatest height from the ground surface as a reference pixel and may set an expanded area including pixels that surround the reference pixel and satisfy designated conditions. A height may be calculated based on a distance. The estimator 20 may estimate a candidate head area within an area around the reference pixel in the expanded area. The estimator 20 may repeatedly perform candidate head area estimations with respect to movement areas other than the set expanded area to detect two or more objects grouped into one movement area without missing any object.

The determiner 30 tracks the candidate head area (operation S65) and determines whether the candidate head area satisfies the circle-similarity condition (Equation (1)) and the spherical curvature conditions (Equations (2) and (3)) in every frame (operation S66).

Figure 13:
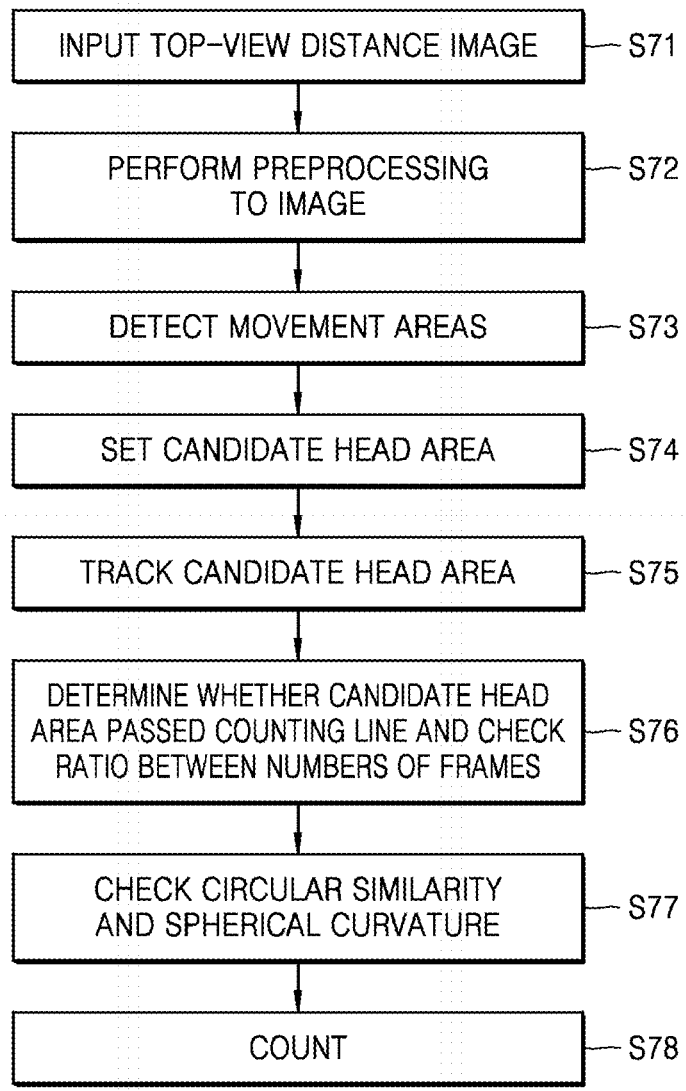
FIG. 13 is a flowchart of a method of counting a number of persons, according to another exemplary embodiment.

The counter 40 determines whether a tracked path of the candidate head area passes a counting line and calculates a ratio between a total number of frames in which the candidate head area is detected and a number of valid frames in which the candidate head area is identified as a head of a person (operation S67). If the tracked path of the candidate head area passes the counting line and the ratio between the numbers of frames is equal to or greater than the fourth pre-set critical value, the counter 40 finally counts the candidate head area as a person (operation S68). FIG. 13 is a flowchart for describing a method of counting a number of persons according to another exemplary embodiment.

The method of counting a number of persons shown in FIG. 13 may be performed by the counter 40 of FIG. 1. Descriptions already given above with reference to FIGS. 1 through 11 may be omitted below.

The method of counting a number of persons shown in FIG. 13 is identical to the method of counting a number of persons shown in FIG. 12 from the input of a top-view distance image to the estimation of a candidate head area. However, the exemplary embodiment of FIG. 13 is different from the exemplary embodiment of FIG. 12 in that the person counting device tracks a set candidate head area, determines whether the set candidate head area passes a counting line first, and determines whether only the candidate head area that has passed the counting line is an actual head of a person. The exemplary embodiment of FIG. 13 may reduce the load on a person counting apparatus compared to the exemplary embodiment of FIG. 12, in which it is determined whether a candidate head area is an actual head of a person in every frame.

The person counting apparatus 1 receives a top-view distance image from the distance camera 2 (operation S71).

The detector 10 performs a preprocessing to the input distance image (operation S72) and detects at least one movement area (operation S73).

The estimator 20 sets up a candidate head area, which is an area estimated as a head of a person, in each movement area (operation S74).

The person counting apparatus 1 tracks the candidate head area via a tracker (operation S75), and the counter 40 determines whether a tracked path of the candidate head area passes a counting line (operation S76).

If the candidate head area passes the counting line, the determiner 30 determines whether the candidate head area in at least one frame selected from among all frames, in which the candidate head area is detected, satisfies the circle-similarity condition and the spherical curvature conditions (operation S77). The frame including the candidate head area to be determined may be set by a user in advance. For example, the frame including the candidate head area to be determined may be a frame immediately after the candidate head area passes the counting line, the first frame in which the candidate head area is detected, all frames, or all frames after the candidate head area passes the counting line.

If the candidate head area of the selected frame satisfies the circle-similarity condition and the spherical curvature conditions, the determiner 30 determines the candidate head area as an actual head of a person, and the counter 40 finally counts the candidate head area as a person (operation S78).

Figure 14:
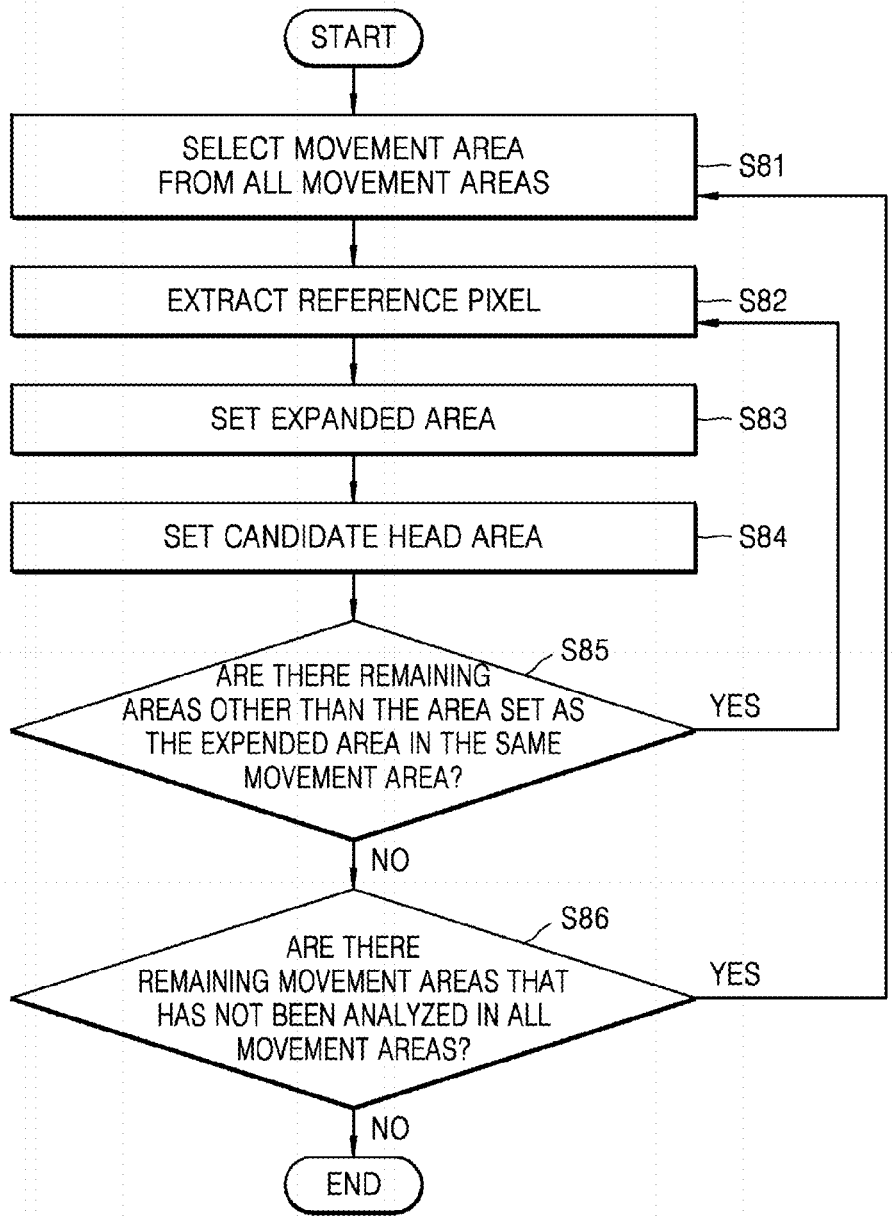
FIG. 14 is a flowchart of a method of estimating a candidate head area, according to an exemplary embodiment.

FIG. 14 is a detailed flowchart of the operation for estimating a candidate head area shown in FIGS. 12 and 13.

If two or more objects independently move in a top-view distance image, two or more movement areas may be detected. Furthermore, if two or more objects are adjacent to one another, movements of the two or more objects may be grouped and detected as a single movement.

The estimator 20 selects one from among a plurality of movement areas as a movement area to be determined (operation S81).

The estimator 20 extracts a reference pixel corresponding to the smallest distance from a camera from the selected movement area (operation S82). In other words, the reference pixel is a pixel corresponding to the greatest height from the ground surface and functions as a reference point for determining a head area.

When the reference pixel is extracted, the estimator 20 sets an expanded area around the reference pixel (operation S83). The estimator 20 includes surrounding pixels with the same height as the reference pixel or surrounding pixels of which change of height is constant or decreases in the expanded area. The expanded area refers to an area estimated as a single object.

The estimator 20 sets an area around the reference pixel as a candidate head area (operation S84). The estimator 20 sets the reference pixel and surrounding pixels with heights that differ from the height of the reference pixel within the first pre-set critical value as a candidate head area.

Next, the estimator 20 determines whether an area other than the area set as the expanded area exists in a same movement area (operation S85). If an area other than the area set as the expanded area exists, operations S82 through S84 are performed again.

The estimator 20 determines whether there is a movement area from among the plurality of detected movement areas that has not been analyzed (operation S86). If there is a movement area that has not been analyzed, operations S81 through S85 are performed again, thereby estimating candidate head areas with respect to all movement areas.

Unlike a counting system in the related art that only considers movement areas, a shape of an object, whether the shape satisfies designated conditions, and a number of frames in which the corresponding conditions are satisfied are also considered in the above exemplary embodiments of the inventive concept, and thus a number of persons may be counted more accurately.

The above exemplary embodiments of the inventive concept may be applied to any of various locations in which it is necessary to accurately count a number of persons. The above exemplary embodiments of the inventive concept may be applied to infrastructure facilities, such as a hospital and a harbor, and commercial facilities, such as a store and a casino. Furthermore, the above exemplary embodiments of the inventive concept may also be utilized with respect to means of transportation, such as an airplane, a ship, or a train, a factory, or a workshop in which it is necessary to count a number of persons therein in case of the possible occurrence of accidents. For example, the above exemplary embodiments of the inventive concept may be applied for distinguishing a person and an object from each other, e.g., a person pushing a cart at the entrance of a mart, a person carrying an object in a workshop, etc. Since safe and effective evacuations from various disasters are have become more prioritized recently, the above exemplary embodiments of the inventive concept may be applied to systems for determining a number of remaining persons in a limited space, such as a workshop, an airplane, or a ship, in the case of fire or a similar disaster.

The above-described methods or operations can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. (Also, functional programs, codes, and code segments for accomplishing the inventive concept can be easily construed by programmers skilled in the art to which the inventive concept pertains.)

As described above, according to the above exemplary embodiments, a method and apparatus for accurately counting a number of persons even in complicated situations in which a plurality of persons move adjacent to one another or an object that resembles a person moves may be embodied.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of counting a number of persons in at least one image frame, the method comprising:
   detecting a movement area in a top-view distance image, of the at least one image frame captured by a camera, providing distance information;
   estimating, via a processor, a candidate head area from the movement area based on the distance information; and
   determining, via the processor, whether the candidate head area is an actual head of a person based on a similarity to a circle of the candidate head area and a spherical curvature of the candidate head area estimated from the distance information about the candidate head area,
   wherein the estimating the candidate head area comprises:
      extracting a reference pixel, which corresponds to a greatest height from a ground surface in the at least one image frame, from the movement area;
      setting an expanded area comprising the reference pixel, surrounding pixels having a same height as the reference pixel, and surrounding pixels whose change in height is constant or decreasing; and
      setting the candidate head area comprising the reference pixel and surrounding pixels with heights that differ from the height of the reference pixel within a threshold value.

2. The method of claim 1, further comprising:
   determining whether an another area other than the expanded area exists in the movement area; and
   if it is determined that the another area exists, setting the another area as another movement area, and repeating the extracting the reference pixel, the setting the expanded area and the setting, and the setting the candidate head area with respect to the another movement area.

3. The method of claim 1, wherein the estimating the candidate head area is repeatedly performed in another movement area.

4. The method of claim 1, wherein, in the determining whether the candidate head area is the actual head of the person, the similarity to the circle of the candidate head area is determined by determining whether a ratio of a first area of a smallest circle surrounding the candidate head area and a second area of the candidate head area exceeds a pre-set critical value.

5. The method of claim 4, wherein, in the determining whether the candidate head area is the actual head of the person, the spherical curvature of the candidate head area is determined using information about a height of a plurality of points on each of at least one reference line extending across the candidate head area.

6. The method of claim 1, wherein the determining whether the candidate head area is the actual head of the person comprises:
   determining satisfaction of a circle-similarity condition by determining whether a ratio of a first area of a smallest circle surrounding the candidate head area and a second area of the candidate head area exceeds a first pre-set critical value is satisfied;
   if at least one reference line extending across the candidate head area is approximated to a quadratic function including a location of a point on the at least one reference line and a height of the point on the at least one reference line from the ground surface in the at least one image frame as variables of the quadratic function, determining satisfaction of a spherical curvature condition by determining whether a pole of the quadratic function exists in the candidate head area and whether a second-order coefficient is smaller than or equal to a second pre-set critical value; and
   setting the candidate head area satisfying the circle-similarity condition and the spherical curvature condition to be the actual head of the person.

7. The method of claim 6, wherein the determining satisfaction of the spherical curvature condition comprises determining whether each of the at least one reference line arranged at a designated interval in the candidate head area satisfies the spherical curvature condition.

8. The method of claim 1, further comprising, if a tracked path of the candidate head area in the at least one image frame passes a counting line and a ratio of a total number of image frames in which the candidate head area is detected to a number of valid frames in which the candidate head area is determined as being the actual head of the person is equal to or greater than a pre-set critical value, counting the candidate head area as the person.

9. The method of claim 1, wherein the determining whether the candidate head area is the actual head of the person comprises, if a tracked path of the estimated candidate head area in the at least one image frame passes a counting line, determining whether the estimated candidate head area is the actual head of the person.

10. A person counting apparatus comprising:
    a camera configured to capture at least one image frame;
    a processor; and
    a computer-readable storage medium storing instructions which, when executed by the processor, cause the processor to perform operations comprising:
       detecting a movement area in a top-view distance image, of the at least one image frame, providing distance information;
       estimating a candidate head area from the movement area based on the distance information; and
       determining whether the candidate head area is an actual head of a person based on a similarity to a circle of the candidate head area and a spherical curvature of the candidate head area estimated from the distance information about the candidate head area, wherein the estimating the candidate head area comprises:
extracting a reference pixel, which corresponds to a greatest height from a ground surface in the at least one image frame, from the movement area;
setting an expanded area comprising the reference pixel, surrounding pixels having a same height as the reference pixel, and surrounding pixels whose change in height is constant or decreasing; and
setting the candidate head area comprising the reference pixel and surrounding pixels with heights that differ from the height of the reference pixel within a threshold value.

11. The person counting apparatus of claim 10, wherein the estimating the candidate head area further comprises determining whether an another area other than the expanded area exists in the movement area; and
in response to the determining that the another area exists, setting the another area as another movement area, and repeat the extracting the reference pixel, the setting the expanded area and the setting, and the setting the candidate head area with respect to the another movement area.

12. The person counting apparatus of claim 10, wherein the estimating the candidate head area further comprises repeatedly performing the estimating the candidate head area in another movement area.

13. The person counting apparatus of claim 10, wherein the determining whether the candidate head area is the actual head of the person comprises determining the similarity to the circle of the candidate head area by determining whether a ratio of a first area of a smallest circle surrounding the candidate head area and a second area of the candidate head area exceeds a pre-set critical value.

14. The person counting apparatus of claim 13, wherein the determining whether the candidate head area is the actual head of the person comprises determining the spherical curvature of the candidate head area using information about a height of a plurality of points on each of at least one reference line extending across the candidate head area.

15. The person counting apparatus of claim 10, wherein the determining whether the candidate head area is the actual head of the person comprises:

determining satisfaction of a circle-similarity condition by determining whether a ratio of an area of a smallest circle surrounding the candidate head area and the area of the candidate head area exceeds a first pre-set critical value is satisfied;

if at least one reference line extending across the candidate head area is approximated to a quadratic function including a location of a point on the at least one reference line and a height of the point on the at least one reference line from the ground surface in the at least one image frame as variables of the quadratic function, determining satisfaction of a spherical curvature condition by determining whether a pole of the quadratic function exists in the candidate head area and whether a second-order coefficient is smaller than or equal to a second pre-set critical value; and determining the candidate head area satisfying the circle-similarity condition and the spherical curvature condition to be the actual head of the person.

16. The person counting apparatus of claim 15, wherein the determining whether the candidate head area is the actual head of the person further comprises determining whether each of the at least one reference line arranged at a designated interval in the candidate head area satisfies the spherical curvature condition.

17. The person counting apparatus of claim 10, wherein the computer-readable storage medium stores additional instructions which, when executed by the processor, cause the processor to perform further operations comprising counting the candidate head area as the person if a tracked path of the candidate head area in the at least one image frame passes a counting line and a ratio of a total number of image frames in which the candidate head area is detected to a number of valid frames in which the candidate head area is determined as being the actual head of the person is equal to or greater than a pre-set critical value.

18. The person counting apparatus of claim 10, wherein the determining whether the candidate head area is the actual head of the person comprises determining that the estimated candidate head area is the actual head of the person if a tracked path of the estimated candidate head area in the at least one image frame passes a counting line.

* * * * *